United States Patent [19]
Pawsat et al.

[11] Patent Number: 5,553,950
[45] Date of Patent: Sep. 10, 1996

[54] BICYCLE HUB BODY CONSTRUCTION

[75] Inventors: Carlton P. Pawsat; William F. Lowe, both of Maysville, Ky.

[73] Assignee: Wald Manufacturing Co., Inc., Maysville, Ky.

[21] Appl. No.: 311,608

[22] Filed: Sep. 23, 1994

[51] Int. Cl.⁶ ............................ F16C 13/00; B60B 27/00
[52] U.S. Cl. ................................ 384/545; 29/894.361
[58] Field of Search ................ 384/545; 29/894.36, 29/894.361, 894.362

[56] References Cited

U.S. PATENT DOCUMENTS

| | | | |
|---|---|---|---|
| 448,509 | 3/1891 | Donnelly | 384/545 |
| 605,870 | 6/1898 | Gibelmann | 384/545 |
| 644,139 | 2/1900 | Laass | 29/894.361 X |
| 743,843 | 11/1903 | Elliott | 29/894.361 X |
| 1,414,270 | 4/1922 | Fry et al. | 384/545 |
| 2,297,960 | 10/1942 | Hood | 384/545 X |
| 2,917,816 | 12/1959 | Samson | 29/894.362 |
| 3,131,008 | 4/1964 | Dian | 384/545 |
| 3,428,377 | 2/1969 | Christian et al. | 384/545 |
| 3,858,942 | 1/1975 | Humlong | 301/110.5 |
| 3,871,710 | 3/1975 | Dian et al. | 384/545 X |

FOREIGN PATENT DOCUMENTS 545150  11/1957  Italy ..................... 384/545

*Primary Examiner*—Thomas R. Hannon
*Attorney, Agent, or Firm*—Wood, Herron & Evans, P.L.L.

[57] ABSTRACT

A bicycle hub body for the front hub assembly of a bicycle wheel has two hub flanges each with an opening therein having a spline structure formed around its circumference with alternating teeth and grooves extending radially inwardly of the opening. A tubular center section extends between the flanges to support and maintain the flanges apart and includes ductile ends which extend into the flange openings and are outwardly pressed into intimate surface-to-surface contact with the flange spline structures and the ductile ends are deformed against the flange spline structures to have cooperating spline structures including radially outwardly extending grooves and teeth which align with the teeth and grooves, respectively, of the bore spline structure.

7 Claims, 2 Drawing Sheets

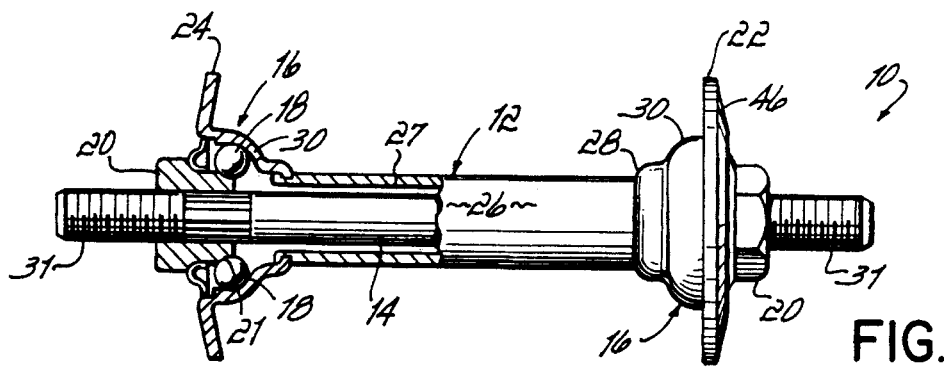
FIG. 1
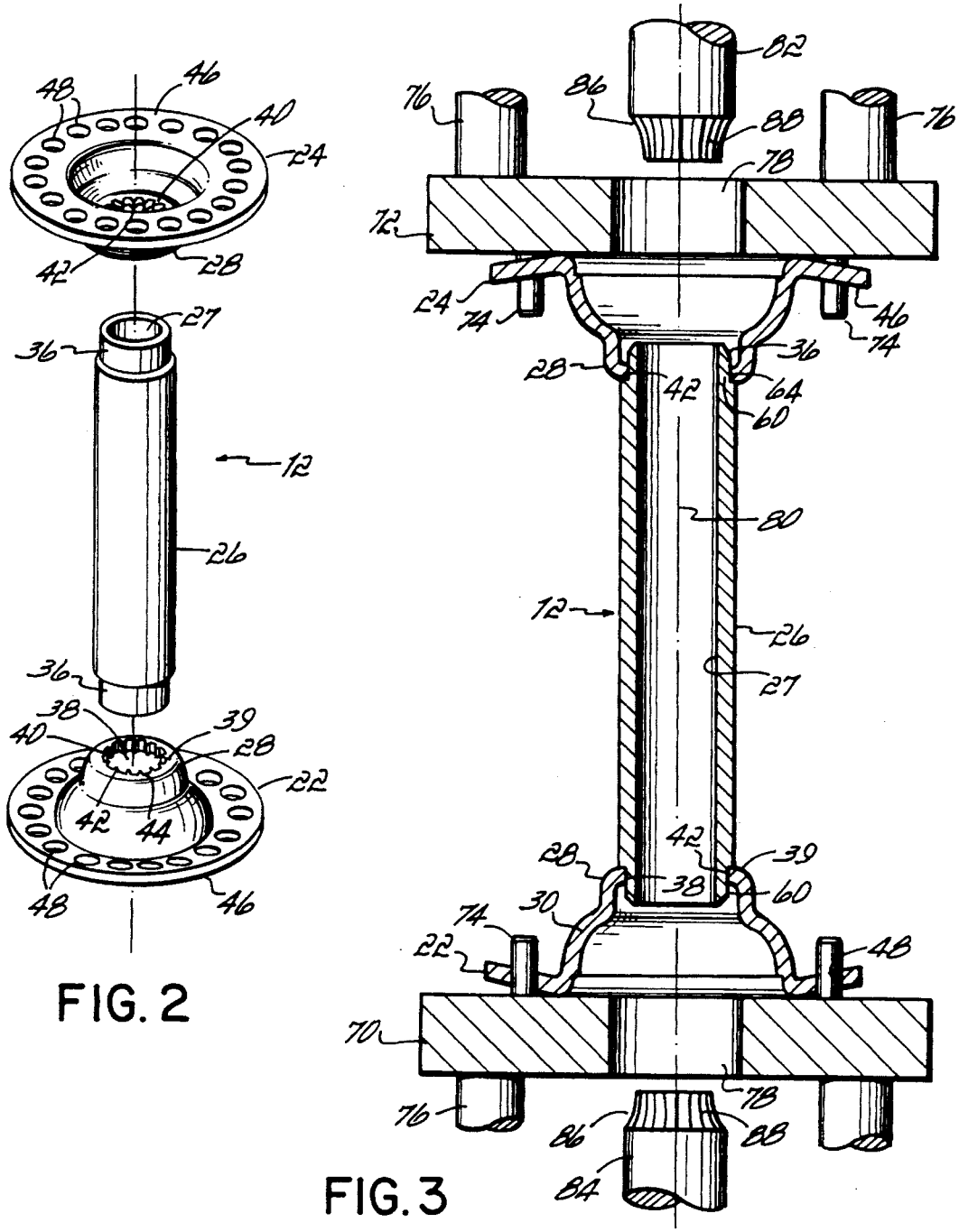
FIG. 2
FIG. 3

BICYCLE HUB BODY CONSTRUCTION

FIELD OF THE INVENTION

This invention relates generally to bicycle hub construction and more specifically to an improved apparatus and method for a hub body of a bicycle front hub assembly which is better able to withstand forces induced thereon by the spokes and rim of a bicycle wheel during the wheel building process.

BACKGROUND OF THE INVENTION

Generally, the main components of a front hub assembly of a bicycle include a hub body, an axle extending through the hub body, anti-friction ball bearing structures which are positioned proximate the ends of the hub body to facilitate rotation of the body around the axle, and two cone nuts, one positioned on each end of the axle to hold the assembly together and the ball bearings against the hub body. All of these components are assembled together into a wheel hub and the hub bearings are properly adjusted with respect to the hub body by a bicycle hub manufacturer. At that point, the completed hub is ready to be assembled with the remainder of the front wheel components, such as the spokes and the rim, usually by a bicycle manufacturer.

A typical front hub body generally includes two flanges which are fixed to the ends of an intermediate tubular center section which holds the flanges spaced apart from each other. The two flanges are adapted to receive one end of numerous bicycle wheel spokes while the other ends of the spokes are fastened to the wheel rim. The hub flanges also serve as the outer or rotating hub bearing races which are operable to seat the ball bearings in proper position with respect to the hub body. A common, continuous bore passes through both of the hub flanges and the intermediate center section. The front axle of the hub assembly passes through the bore.

Many different designs and methods have been utilized for constructing the bicycle hub body. One such hub design is illustrated in the patent of Donnelly U.S. Pat. No. 448,509 which shows the entire hub body formed as a unitary structure. Another design involves constructing the hub body from two symmetrical components wherein each component consists of a flange and one-half of the intermediate center section. The two symmetrical components are then joined together by connecting the two ends of the two intermediate center sections such as by welding or another suitable attachment method. Still another hub body design utilizes three components including two flanges and a tubular center section. The two flanges are connected to opposite ends of the tubular center section to form the hub body, and examples of such a construction are shown in Samson U.S. Pat. No. 2,917,816 and Humlong U.S. Pat. No. 3,858,942. In the Samson patent, the components are designed so that there is an interference fit between the ends of the tubular center section and the mating bores in the two flanges. The components are forced together until the two ends of the tubular center section contact annular flanges or stops at the ends of the mating bores in the two hub flanges. In the Humlong patent, the diameter of each end of the tubular center section is reduced to provide a shoulder or stop for the two hub flanges to contact. During assembly, the reduced diameter on each end of the tube is inserted into a mating bore in each hub flange and are assembled onto the reduced diameter until they contact the shoulder or stop. Once the hub flanges are in contact with the shoulder, the outside ends of the reduced diameters on each end of the tubular center section are crimped or flared outwardly to secure the hub flanges to the tubular center section and to fix the position of the hub flanges with respect to the tubular center section and with respect to each other.

After the front hub body has been constructed and the front hub assembled, the hub is further assembled with other front wheel components to make a complete front bicycle wheel. The tubular center section of the hub body, in the completed wheel assembly, serves as a spacer to keep the two hub flanges a fixed distance apart and overcome forces on the wheel which tend to drive the two flanges together. For example, a portion of each flange serves as an outer rotating bearing race to hold the ball bearing structures of the hub assembly. As a result, various forces are transmitted to the flanges through these bearing races to generally force the two flanges toward each other in a direction parallel to the center line of the axle. The tubular center section operates to oppose these forces and thereby keeps the two flanges the correct distance apart on the bicycle wheel.

Wheel forces are also transmitted to each flange by the wheel spokes. On the front wheels of most bicycles, the spokes are arranged in an alternating crossing pattern. Each spoke in the wheel transmits a force to the hub flange, and the force can be divided into two vector components, one vector component is directed parallel to the front axle and tends to pull the two flanges toward each other as discussed above. These forces are opposed by the hub assembly, such as with shoulders or stubs at the ends of each tubular center section against which the hub flanges abut. The second vector component of the wheel force transmitted to the hub flanges by each spoke is in a direction tangential to the periphery of the hub flanges such that the spokes apply a torquing force to the hub flange. This torque tends to rotate the hub flanges in either a clockwise or counter-clockwise direction with respect to the tubular center section and with respect to each other depending upon the particular crossing pattern of the wheel spokes. Preferably, the number of spokes in each flange applying a clockwise torque would be equal to the number of spokes applying a counter-clockwise torque so that the torquing forces of the spokes offset each other.

However, during assembly of the bicycle wheel, the spokes are generally not tightened in unison. Instead, they are tightened individually in a predetermined sequence. Despite the efforts of the bicycle wheel assembler to tighten each spoke equally, there will generally always be a variation between the tension in one spoke versus the tension in another adjacent spoke in the wheel. As a result, the variations in spoke tension around the wheel cause variations in the forces transmitted to the hub flanges by the spokes, which, in turn, result in variations in the component of the force which applies a torque to the hub flanges. Oftentimes, as the spokes are tightened, a torquing force is applied to the hub flanges which is greater than the forces which the joint between the end of the tubular center section and the flange can withstand. As a result, the joint fails and the flange rotates with respect to this tubular center section. When the flange rotates, the distance between the holes for the spokes in that particular hub flange are changed with respect to the corresponding holes for the opposite ends of each spoke in the wheel rim. That is, the angular orientation of the hub flange with respect to the wheel rim is changed. Depending upon the spoke crossing pattern of the wheel, the distance between the hole in the hub flange and the hole in the rim for each spoke either increases or decreases. If the hub flange rotates a large amount and the hole distance changes significantly, the wheel assembly cannot be completed with the fixed length spokes available.

Therefore, it is desirable to prevent rotation of the hub flanges with respect to the center section and with respect to each other in a hub body in order to yield proper assembly of a bicycle wheel. To this end, it is desirable to construct a hub body with hub flanges that are able to withstand the torquing forces applied to the hub flanges. One way of increasing the strength of the joint between a flange and the center section is to weld or braze the joint. However, such an additional assembly process would make construction of the hub body more complex, and accordingly, more expensive.

Another possible method is to form irregularities along the circumference of the hub flange bore and then to force the flange onto the reduced end diameter of the tubular center section. Once assembled, the end of the tubular center section is crimped or flared to complete the joint and to secure the flanges to the center section. However, there is a limit to the amount of forced interference that can be used between the hub flange bore and the end of the tubular center section while still maintaining the integrity of the two components within the constructed hub body. This structural limit placed on the forced interference between the flange and the center section restricts the amount of torquing force which the joint is able to withstand. Therefore, there is still a need for a front wheel hub body construction which is able to withstand a sufficient amount of torquing force on the hub flange while maintaining the integrity of the joint and the construction of the hub body. Furthermore, there is a need for a hub body which may be constructed simply, efficiently, and at a relatively low cost while maintaining the sturdy construction of the hub.

SUMMARY OF THE INVENTION

The present invention addresses the needs within the art by providing a hub body for the front hub assembly of a bicycle wheel which is able to withstand the torquing forces of the wheel spokes during wheel assembly without slippage of the end flanges. The present invention further maintains the integrity of the hub body and assembled hub and is relatively simple to assemble at low cost. To this end, the improved hub body of the present invention includes two hub flanges each having an opening therethrough which are mounted to and supported by a tubular center section. The ends of the tubular center section are ductile and have a reduced diameter from the rest of the center section so that the ends may be placed within the openings of the flanges. Each flange opening has a spline structure formed around its circumference to surround the ductile ends of the center section. The spline structure includes alternating teeth and grooves which extend radially inwardly with respect to the flange opening.

The ductile ends of the center section are outwardly pressed into intimate surface-to-surface contact with the spline structures of the hub flanges. The ductile ends are deformed against the flange spline structures such that the ductile ends have cooperating spline structures including grooves and teeth which extend radially outwardly and are aligned with the teeth and grooves, respectively, of the flange spline structures. The interlocking splines of the hub flanges and the center section ends created by the deformation of the ends around the spline structures of the hub flanges provides good contact strength between the center section and the flange and prevents rotation of a flange with respect to the center section and with respect to the opposing flange even when relatively high torquing forces are applied to the flange by the wheel spokes. Furthermore, the improved hub body construction of the present invention maintains the physical integrity of the flange and center section components. Furthermore, the pressed and deformed spline structures of the center section ends secure the flanges thereto while a shoulder adjacent each end prevents each flange from moving toward the other under the lateral forces of the wheel spokes.

Preferably, the flanges are hardened to a hardness which is greater than the hardness of the ductile ends of the center section so that the ductile ends may be deformed around the flange spline structure. Furthermore, the hardened flanges are configured to serve as bearing races for the ball bearings of the hub assembly. In one embodiment, the teeth and adjacent grooves of the flange spline structure are generally trapezoidal in shape, although other shapes might be utilized.

The hub body of the present invention is formed by positioning a flange onto each ductile end of the tubular center section such that the ductile ends extend into the flange openings. Each ductile end section is preferably of a reduced diameter in order to allow the ductile end to be inserted into the flange opening and inside the spline structure. As mentioned, the flange opening has a spline structure formed around its circumference including alternating teeth and grooves. The ductile ends are adjacent the spline structures of the hub flanges.

An arbor punch having a punch end is inserted into the center bore of the tubular center section proximate the ductile ends. The punch end of the arbor punch has a spline structure defined thereon with outwardly extending radial grooves and teeth. The dimensions and angular orientation of the teeth and grooves on the spline structure are such that the punch end is able to seat within the spline structure in the flange opening. To construct the hub body of the present invention, the arbor punch is forcibly pressed to drive the punch end into each ductile end and force the ductile end outwardly and into intimate surface-to-surface contact with the flange spline structure on the hub flange. Through the force of the arbor punch, the ductile end is spread and deformed against the flange spline structure to create an opposing spline structure on the ductile end which includes radially outwardly extending grooves and teeth that align with teeth and grooves of the bore spline structure as discussed above. The press operation is relatively simple and inexpensive and generally does not add to the complexity of assembling the hub body.

A plurality of spoke holes are positioned around the periphery of the flange and encircle the opening. Preferably, the number of one of the teeth and the grooves of the flange spline structure is equal to or a multiple of the number of spoke holes around the flange. Furthermore, each of the spoke holes has the same relative angular orientation with respect to the teeth and grooves of the flange spline structure. Before pressing the ductile ends and forming spline structures, the angular positions of the spoke holes in each hub flange must be correctly positioned or staggered with respect to the other hub flange. Since the number of teeth or grooves are equal to a multiple of the number of spoke holes, and the teeth or grooves are always in the same relative angular relationship with respect to the spoke holes, aligning the spoke holes also aligns the spline structures in the opposing flanges in the correct angular position.

The specific details of the present invention and other benefits and advantages of the invention will become more apparent hereinbelow in the following Brief Description of the Figures and Detailed Description of the Invention.

BRIEF DESCRIPTION OF THE FIGURES

The accompanying drawings, which are incorporated in and constitute a part of this specification, illustrate an embodiment of the invention and, together with a general description of the invention given above, and the detailed description given below, serve to explain the principles of the invention.

FIG. 1 is a front view, in partial cross-section, of a hub body assembled in accordance with the principles of the present invention;

FIG. 2 is a disassembled perspective view of the hub body of FIG. 1;

FIG. 3 is an axial cross-sectional view of the hub body of FIG. 2 being assembled with arbor punches in accordance with the principles of the present invention;

DETAILED DESCRIPTION OF THE DRAWINGS

Figure 4:
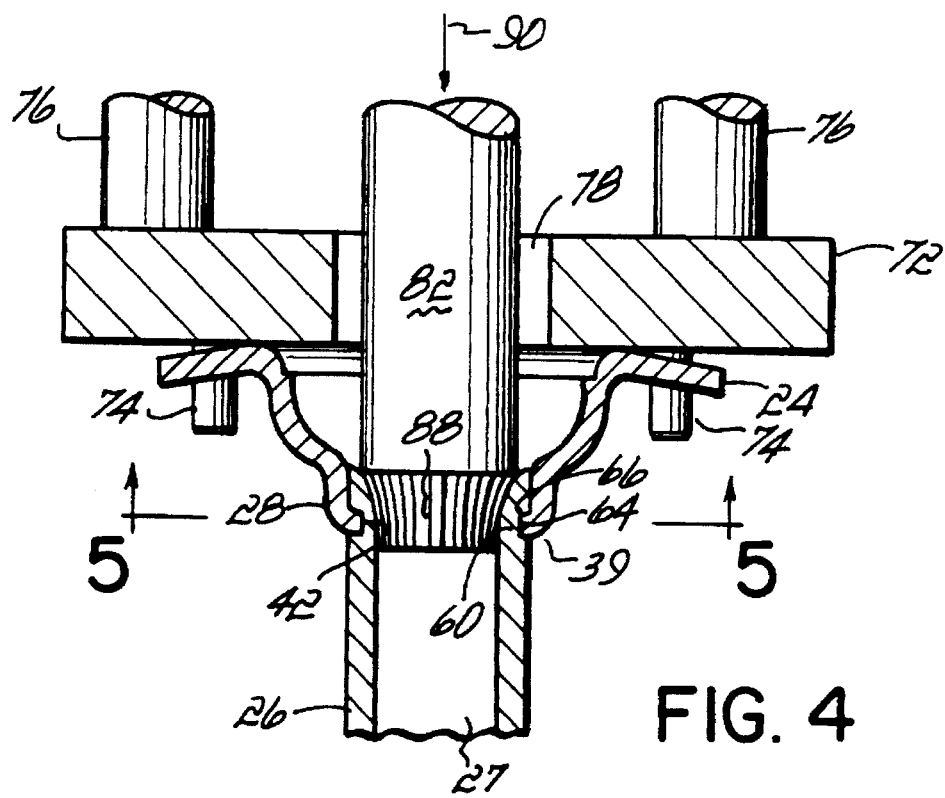
FIG. 4 is a view of one end of the hub body of FIG. 3 with the arbor punch inserted into the hub body.

FIG. 1 shows the front view in partial cross-section of a front hub assembly for a bicycle with a hub body made in accordance with the principles of the present invention. Specifically, the front hub assembly 10 includes a hub body 12 with an axle 14 extending therethrough. Circular anti-friction ball bearing structures 16 hold a plurality of individual ball bearings 18 which encircle axle 14 proximate each end of hub assembly 10. Cone nuts 20 are threaded onto the ends of axle 14 and are positioned against hub body 12 to hold the axle 14 in spaced relation thereto and to secure the ball bearing structures 16 to the hub body 12 to facilitate rotation of hub body 12 around the axle 14 when the hub body 12 is assembled into a bicycle wheel (not shown). More specifically, hub body 12 includes two opposing hub flanges 22, 24 which are held in spaced relation by a tubular center section 26. A bore 27 extends through the center section 26 and flanges 22, 24. Axle 14 extends through bore 27 and beyond each flange 22, 24. Each flange 22, 24 includes an inner portion 28 which defines the opening through the flange and is used to secure the flange to the center section 26 as discussed further hereinbelow. An outer bearing race portion 30 is adjacent inner portion 28 and generally forms a track for the ball bearings 18 of circular bearing structure 16. The cone nuts 20 which secure axle 14 within the hub body 12 are screwed to the threaded ends 31 of axle 14 to hold bearing structure 16 to the bearing race 30 thus allowing the hub body 12 to rotate around axle 14. Cone nuts 20 include inner bearing races 21.

Referring now to FIG. 2, hub body 12 is shown disassembled and is constructed by placing the opposing flanges 22, 24 onto the ends 36 of the center section 26. Each flange includes an opening 38 formed in the inner portion 28 and a spline structure 40 which is formed around opening 38 on a lip 39 extending inwardly from inner portion 28. The spline structure 40 around opening 38 comprises alternating teeth 42 and grooves 44 which extend around the circumference of the opening 38. The ends 36 of center section 26 are preferably reduced in diameter from body 12 to fit within the opening 38 and be surrounded by spline structure 40. When the ends 36 of center section 12 are inserted into the openings 38 of flanges 22, 24, the bore 27 is generally coaxial with the openings 38.

Figure 5:
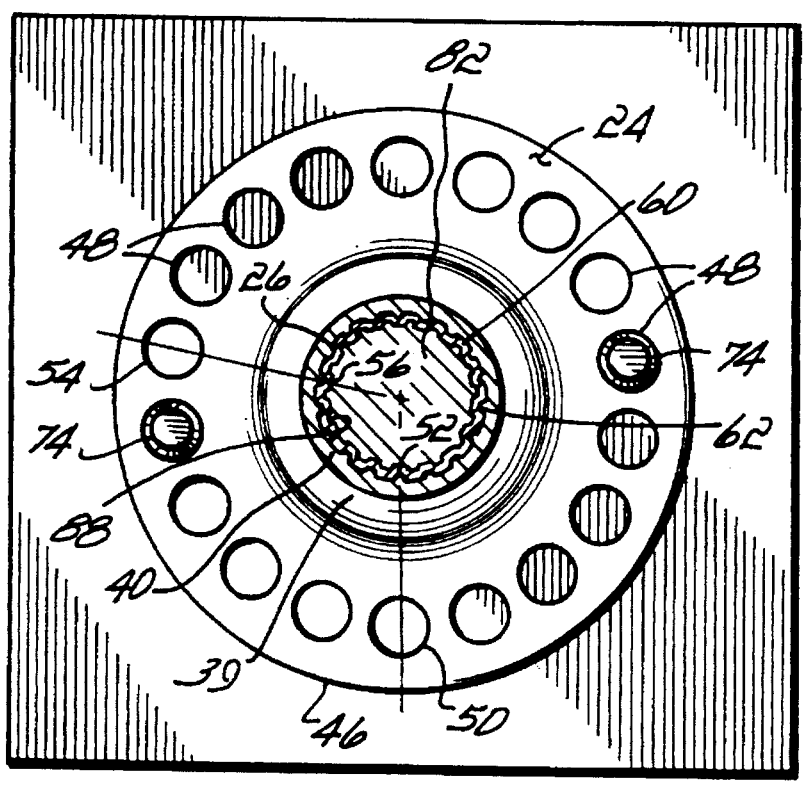
FIG. 5 is a cross-sectional view of the assembled hub body taken on lines 5—5 of FIG. 4.

As illustrated in FIGS. 2 and 5, each hub flange 22, 24 includes an annular portion 46 adjacent the bearing race 30 opposite the inner portion 28. Annular portion 46 includes a plurality of spoke holes 48 which are arranged around the annular portion 46 and are configured to receive one end of the wheel spokes (not shown) when a bicycle wheel is assembled utilizing the hub assembly 10 of the present invention. Preferably, the spoke holes 48 are arranged to be equally spaced around the circumference of the annular portion 46.

The teeth 42 and grooves 44 of the spline structure 40 are each preferably spaced to maintain the same respective angular relationship with respect to the spoke holes 48. In order to accomplish this symmetric angular relationship, the number of teeth 42 or the number of grooves 44 in the bore 38 are preferably equal to or a multiple of the number of spoke holes 48 on the annular portion 46. For example, as illustrated in FIG. 5, when the number of teeth 42 are the same as the number of holes 48, each spoke hole 48 may be made to align radially with an inwardly extending tooth 42. More specifically, spoke hole 50 in FIG. 5 aligns with tooth 52 on the spline structure 40. Similarly, spoke hole 54 aligns with tooth 56. This angular relationship is continued around the circumference of the hub flanges 22, 24.

When hub body 12 has been assembled into a front bicycle wheel, the ends of the wheel spokes (not shown) are held within spoke holes 48, and the opposing ends of the spokes are held within a wheel rim (not shown). When the spokes are tightened in forming the wheel, the spokes impose a torquing force on the hub flanges 22, 24. This is caused when the spokes are not all tightened in unison as is generally the case. Wheel spokes are tightened usually individually in a predetermined sequence, and thus there are always going to be variations in the amount of tension put into each spoke as it is tightened. As discussed above, the torquing force may overcome the strength of the joint between the flanges 22, 24 and the center section 26 which will cause the flanges to rotate with respect to the center section and with respect to each other. The hub body 12 of the present invention prevents such rotation by utilizing a spline structure 60 (see FIG. 5) on the center section ends 36 which is formed by pressing the ductile ends 36 into intimate surface-to-surface contact with the flange spline structures 40 to deform the end sections 36 against the spline structures 40 and form a cooperating spline structure 60 on the ends 36 as discussed hereinbelow. Spline structure 60 includes radially outwardly extending grooves 62 and teeth 64 which interact with the teeth 42 and grooves 44, respectively, of the flange spline structure 40 to secure the hub flanges 22, 24 to the center section 26 and to prevent rotation of the flanges.

To form the hub body 12 of the present invention, an arbor punch is used proximate each flange/center section joint 66 of the hub body 12 as illustrated in FIG. 4. The reduced diameter center section ends 36 are inserted into the inner openings 38 of the hub flanges 22, 24. The ends 36 are preferably constructed to be ductile so that they may be reformed into spline structures 60 (see FIG. 5). The hub flanges 22, 24 and the center section 26 are made of relatively ductile steel. Each hub flange 22, 24 is then hardened prior to assembly of hub body 12. The hardening improves the operation of the bearing races 30 of the flanges and also facilitates deformation of the ends 36 into spline structures 60 during assembly of the hub body 12. The spline structure 40 of the hub flanges is formed in lip 39 around the circumference of opening 38 before each flange 22, 24 is hardened (see FIG. 2). As discussed above, the position of the alternating teeth 42 and grooves 44 maintain the same respective angular relationships with respect to the spoke holes.

To assemble the hub body 12, the flanges 22, 24 are placed on the ends 36 of center section 26 and the assembled body is positioned between opposing press blocks 70, 72 as shown in FIG. 3. The press blocks 70, 72 include alignment pins 74 which extend through the spoke holes 48 of each hub flange 22, 24. The alignment pins 74 ensure that the opposing flanges are oriented angularly so that the spoke holes of flange 22 are in the correct angular position relative to the spoke holes in flange 24. Due to the angular symmetry of the spline structures 40 and spoke holes 48, the teeth 42 and grooves 44 of each spline structure on the respective flanges are also positioned in the correct angular position. The press blocks 70, 72 hold the flanges 22, 24 against the center section ends 36 through appropriate pressing structure 76. Each press block 70, 72 includes a bore 78 which aligns with a center axis 80 of the hub body 12 and the bore 27 of the center section 26 and openings 38 of the hub flanges 22, 24.

Arbor punches 82, 84 are inserted through the bores 78 and into bore 27 proximate each end 36 of the tubular center section 26. The arbor punches 82, 84 are coupled to appropriate press machinery (not shown) which press the punches 82, 84 into the ends 36 at a predetermined force. Each arbor punch includes a tip 86 having a spline structure 88 formed thereon as shown in FIGS. 3 & 4. Tip 86 is inserted into the end 36, and the arbor punch 82 is driven in the direction of arrow 90 to forcibly press tip 86 into end 36 and expand end 36. The spline structure 88 on tip 86 has outwardly oriented teeth and grooves which align with the inwardly oriented teeth 42 and grooves 44 of flange spline structure 40. Spline structure 88 is pressed at such a force as to expand the reduced-diameter end 36 and deform end 36 against the spline structure 40 of the flange 24.

As illustrated in FIG. 5, end 36 is deformed into a spline structure 60 which has outwardly pressed, alternating teeth 64 and grooves 62 which are in intimate surface-to-surface contact with the grooves 44 and teeth 42, respectively, of the flange spline structure 40. Cooperating spline structures 40 and 60 prevent rotation of the flanges 22, 24 with respect to each other and with respect to center section 26 when torquing forces are applied to the flanges by wheel spokes when the bicycle front wheel is assembled. Once the spline structure 60 is formed and the hub body 12 is assembled, the arbor punches 82, 84 are withdrawn and hub body 12 is removed from the press blocks 70, 72 and may be further assembled into a completed front hub assembly 10 for a bicycle, and ultimately into a completed front bicycle wheel.

The hub body constructed in accordance with the principles of the present invention provides a strong hub construction with flanges that do not rotate even under high torquing forces by the wheel spokes. The physical integrity of the components is also not jeopardized. Furthermore, the method of manufacturing the hub assembly is relatively uncomplicated and efficient resulting in reduced assembly time and cost savings to the manufacturer. Furthermore, additional steps to secure the flanges to the center section or to prevent rotation of the flanges are not necessary once the arbor punches have deformed the ends and pressed the ends into intimate surface-to-surface contact with the flange spline structures. In the embodiment illustrated in the Figures and disclosed herein, the alternating teeth and grooves of the spline structures are generally trapezoidal in shape. However, it should be understood that other spline structure shapes might be utilized to produced similar results without deviating from the scope and the inventive concept of the present invention.

While the present invention has been illustrated by the description of the embodiments thereof, and while the embodiments have been described in considerable detail, it is not the intention of applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicants' general inventive concept.

We claim:

1. A bicycle hub body for the front hub assembly of a bicycle wheel comprising:

two hub flanges each having an opening therethrough, each flange opening having a spline structure formed around its circumference including alternating teeth and grooves extending radially inwardly with respect to the opening;

a tubular center section extending between the flanges to support and maintain the flanges spaced apart, the center section including ductile ends extending into the flange openings, each ductile end being outwardly pressed into intimate surface-to-surface contact with the spline structure of a respective hub flange and deformed against the flange spline structure and so as to have a cooperating spline structure including radially outwardly extending grooves and teeth aligned with the teeth and grooves, respectively, of the corresponding bore spline structure;

whereby to provide a joint which secures the flanges to the center section and prevents rotation of the flanges with respect to the center section.

2. The hub body of claim 1 wherein the ductile ends of the center section have a smaller diameter than the diameter of the center section.

3. The hub body of claim 1 wherein the flanges and respective spline structures are hardened to a hardness greater than the hardness of the ductile ends of the center section.

4. The hub body of claim 1 wherein the flanges include a plurality of spoke holes around the periphery of the flange, the number of one of the teeth and grooves of a flange spline structure being equal to or a multiple of the number of spoke holes around the flange.

5. The hub body of claim 4 wherein the spoke holes each have the same relative angular orientation with respect to the teeth and grooves of the flange spline structure.

6. The hub body of claim 1 wherein the teeth and grooves of the flange spline structure are generally trapezoidal in shape.

7. The hub body of claim 1 wherein the flanges include a plurality of spoke holes positioned around the periphery of the flange, the holes of one of the flanges being aligned in angular orientation with respect to the holes of the other flange.

* * * * *